United States Patent [19]

Cloud et al.

[11] 4,357,359

[45] Nov. 2, 1982

[54] METHOD AND APPARATUS FOR MANUFACTURE OF CANDY

[75] Inventors: David A. Cloud; Charles E. Cloud, both of Wilmette; William N. Pearson, Highland Park; Donn A. Hartman, Gurnee, all of Ill.

[73] Assignee: Cloud Corporation, Skokie, Ill.

[21] Appl. No.: 186,331

[22] Filed: Sep. 11, 1980

[51] Int. Cl.³ .......................... A23G 3/00; A23G 3/06; A23G 3/10
[52] U.S. Cl. .................................... 426/103; 426/517; 426/660
[58] Field of Search ....................... 426/103, 517, 660

[56] References Cited

U.S. PATENT DOCUMENTS

| 1,628,251 | 5/1927 | Laskey | 426/517 |
| 2,648,297 | 8/1953 | Cloud | 426/517 |
| 3,557,717 | 1/1968 | Chivers | 426/517 |

OTHER PUBLICATIONS

Minifie; B. W., Chocolate, Cocoa and Confectionery: Science & Technology, Churchill, London, pp. 129–139.

*Primary Examiner*—Jeanette M. Hunter
*Attorney, Agent, or Firm*—Hill, Van Santen, Steadman, Chiara & Simpson

[57] ABSTRACT

A method of manufacture of milk chocolate-coated toffee candy pieces comprising heating a mass of toffee to a softened temperature sufficient to permit portions of it to be pulled from the mass. Pulling strand portions from the mass in the form of fine strands while spooling the strands about a core forming area and causing the spooling to occur along the length and about the periphery of the core forming area to form a continuous length of the core at a core forming area. Contemporaneously axially moving the length of core along its axis off of an end of the core forming area. Then transversely severing an outer end of the axially moving length of core with consecutive cuts to form successive toffee pieces or toffee cores. Immersing the toffee cores in a bath of milk chocolate, and cooling the chocolate-covered cores to place them in condition for packaging.

27 Claims, 23 Drawing Figures

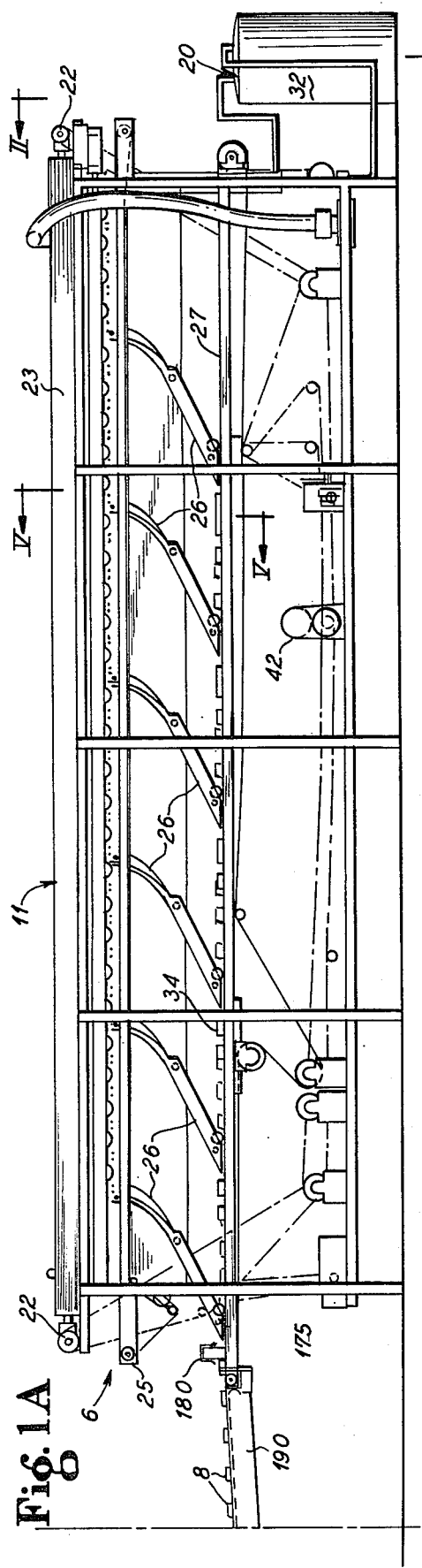
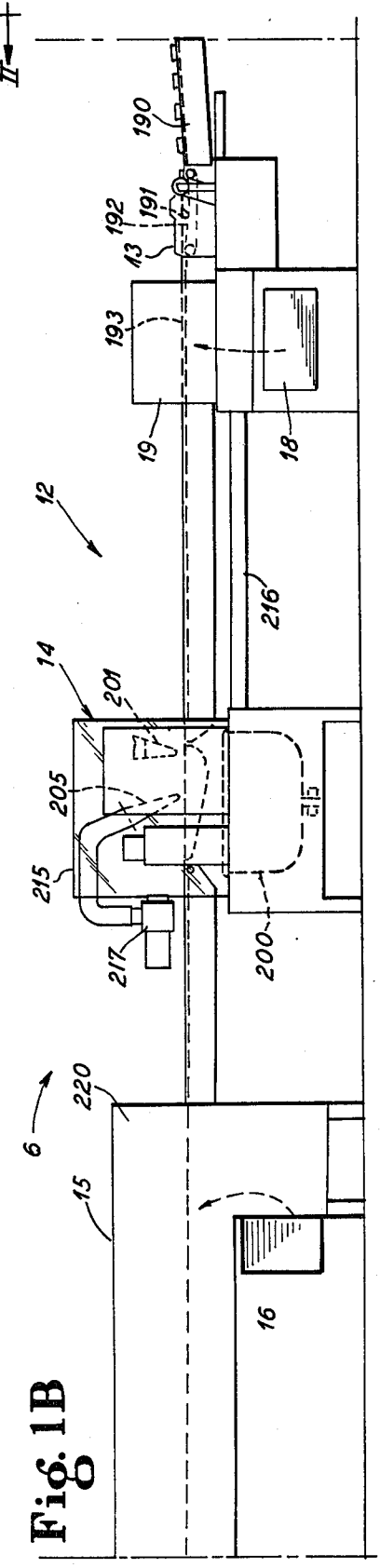
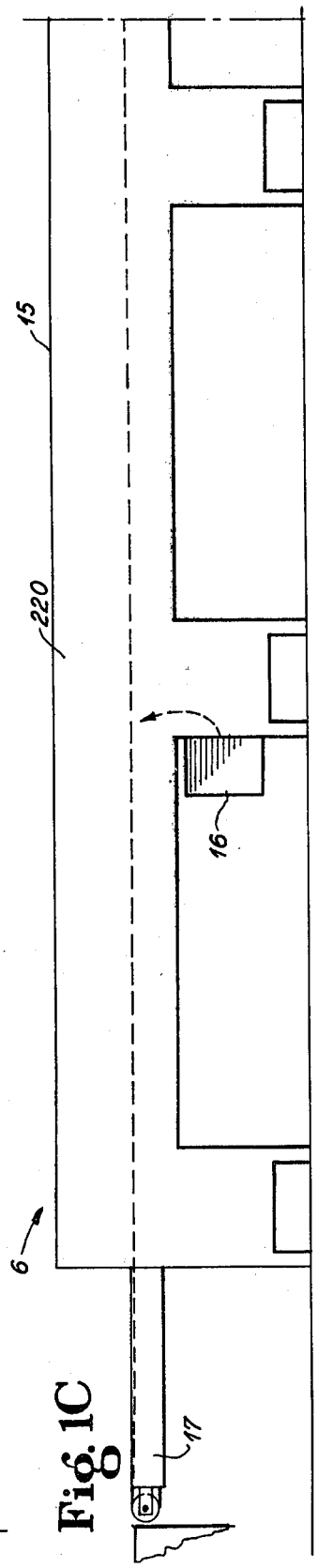
Fig. 1A
Fig. 1B
Fig. 1C

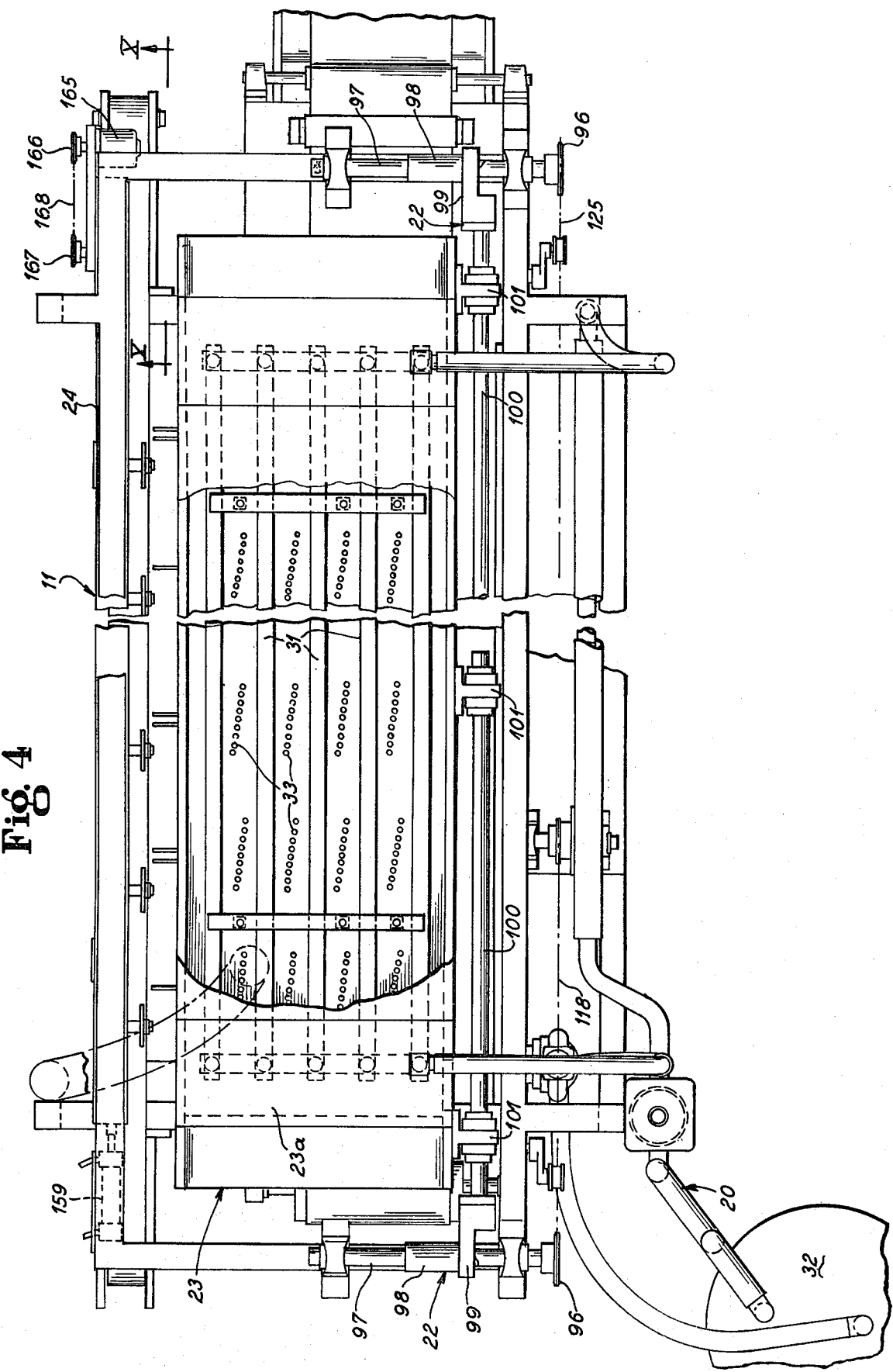

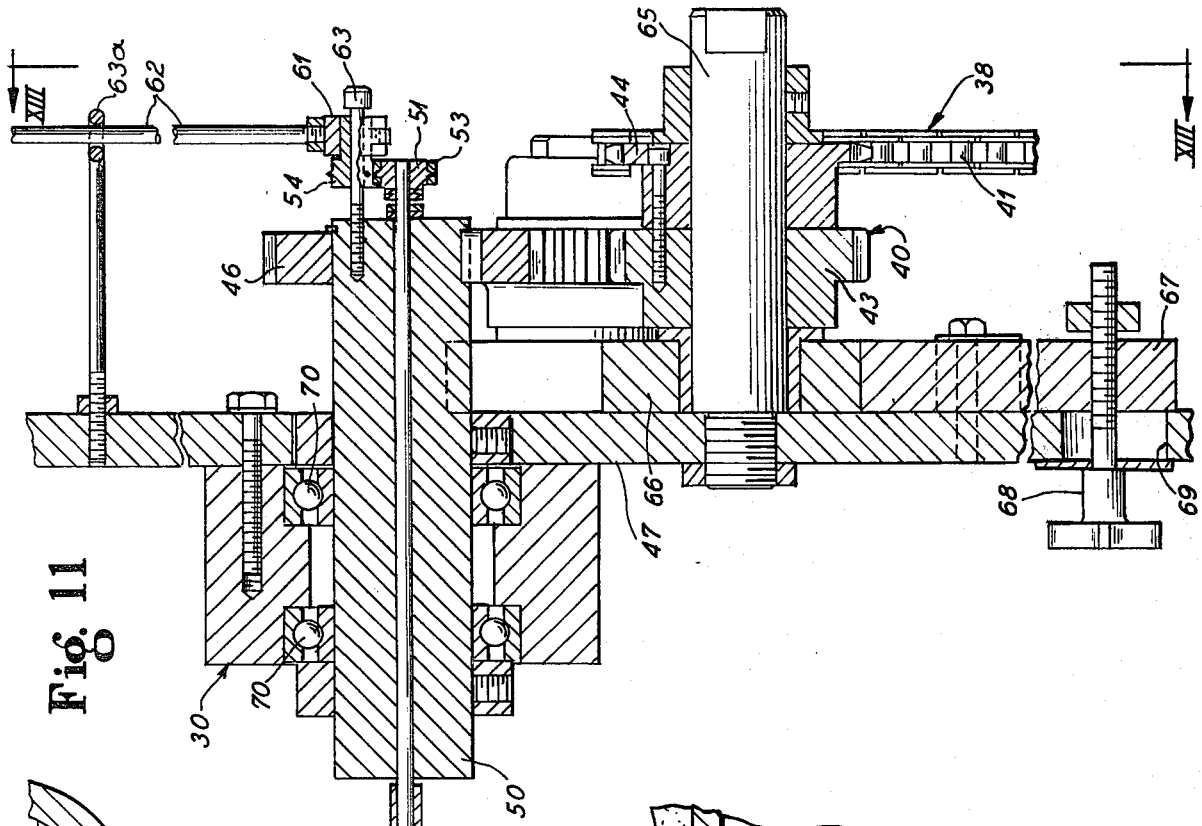
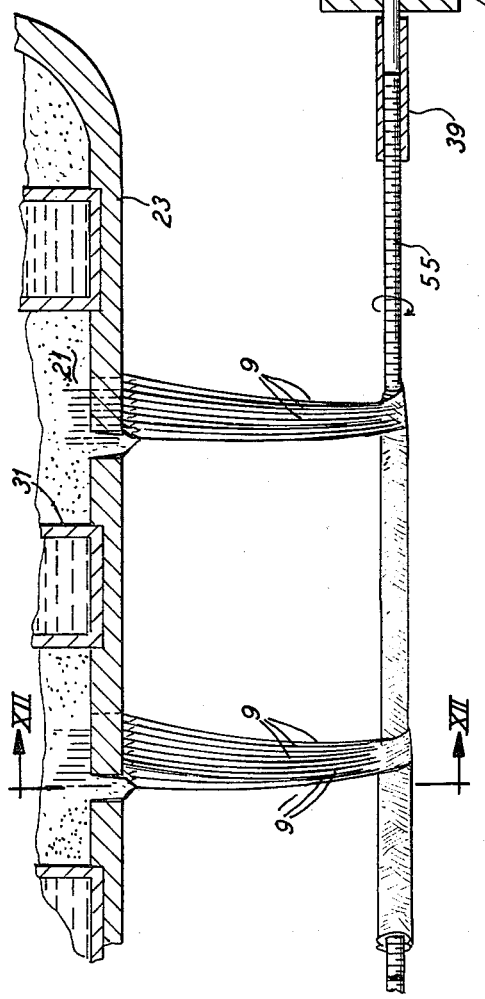
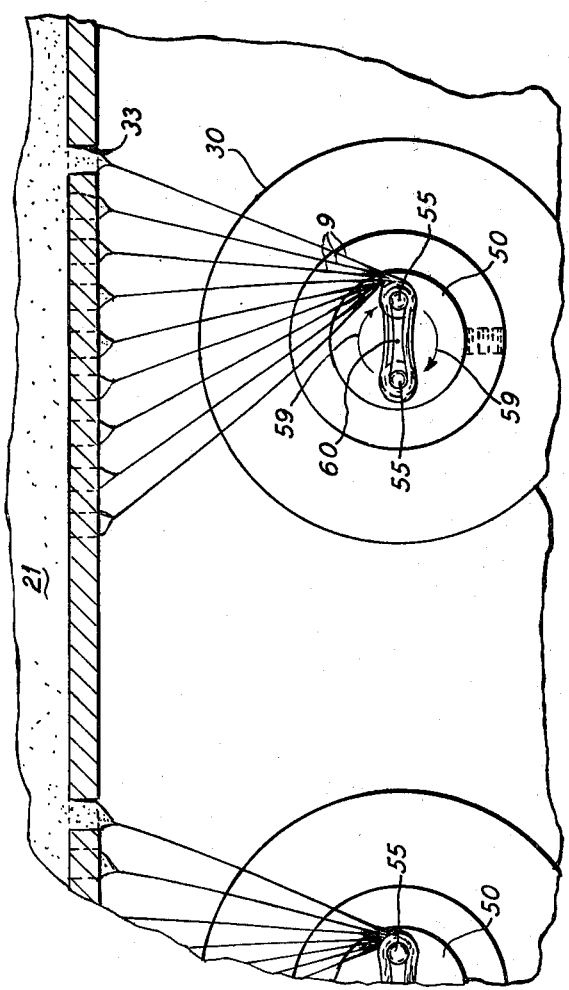
Fig. 11
Fig. 12

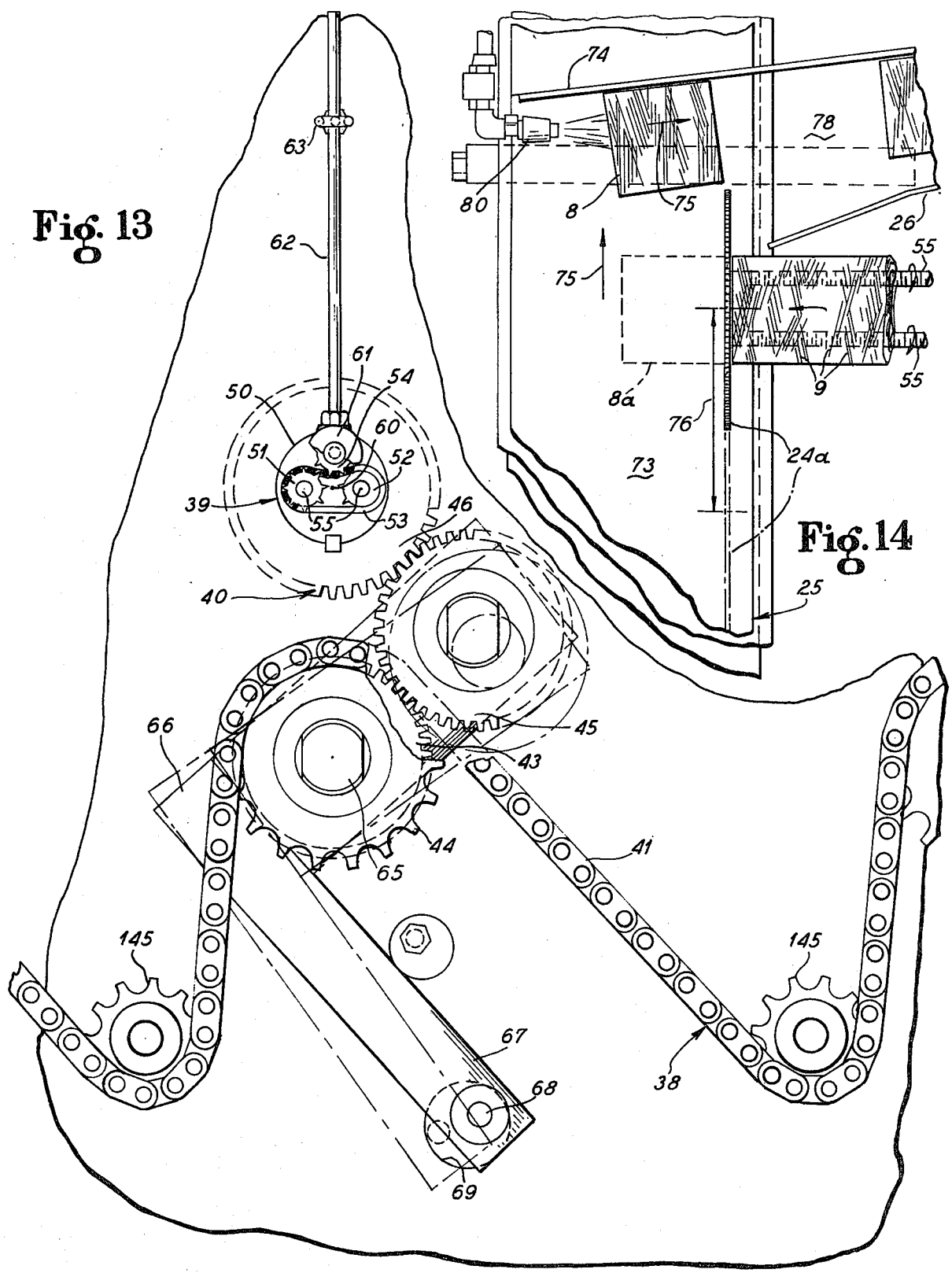

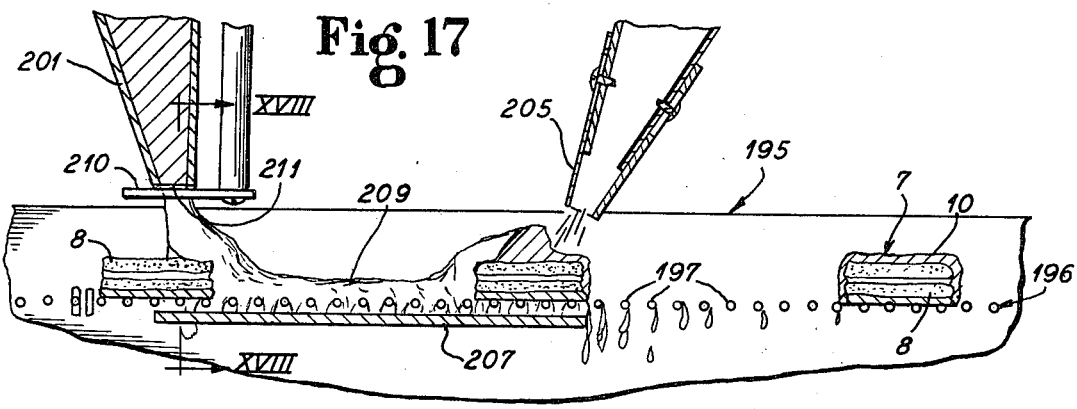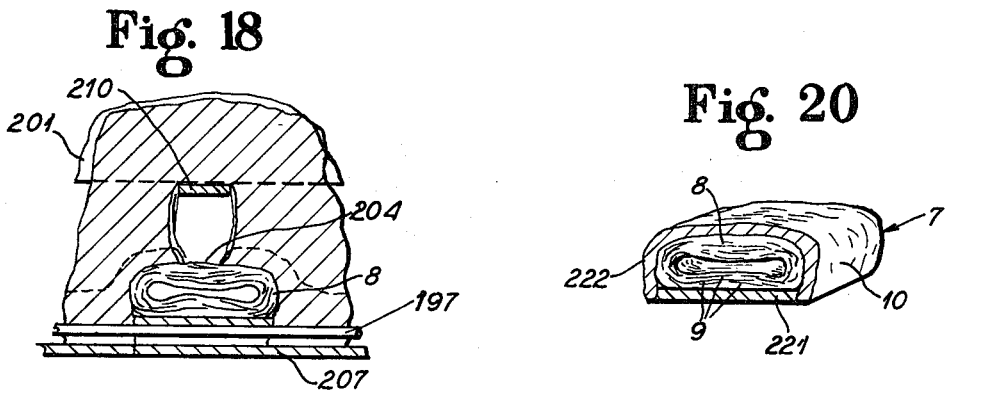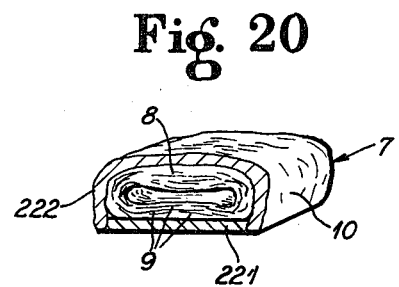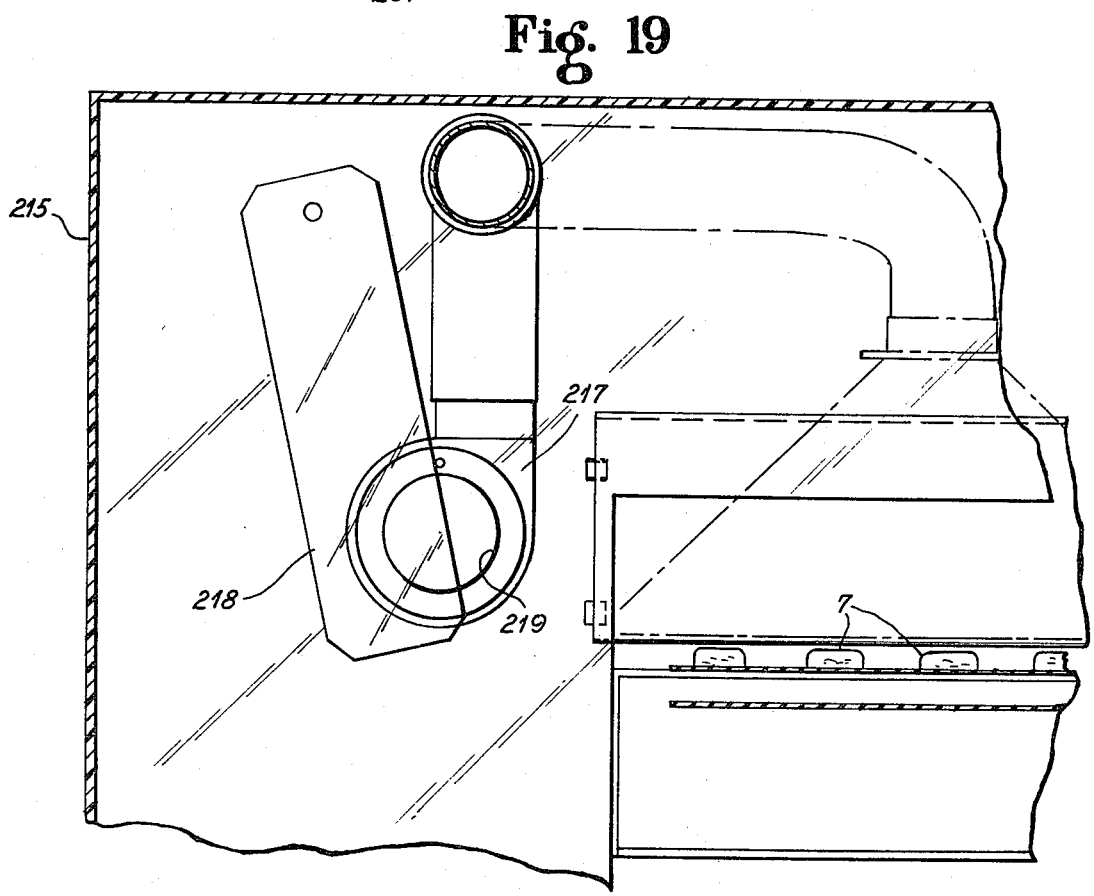

METHOD AND APPARATUS FOR MANUFACTURE OF CANDY

BACKGROUND OF THE INVENTION

1. Field of the Invention

The field of the invention pertains to candy making apparatuses or machines, a method of manufacture of candy, and a new type of candy.

2. The Prior Art

In the past, various types of toffee candy have been in existance including chocolate-covered toffee. The present invention constitutes an improvement of the inventions disclosed in W. S. Cloud U.S. Pat. No. 2,648,299.

BRIEF SUMMARY OF THE INVENTION

The apparatus for manufacture of chocolate-coated toffee candy pieces comprises a toffee header. A heater for heating means is connected to the header for heating a mass of toffee to a softened temperature sufficient to permit portions of the toffee to be pulled from the mass. The header has spaced orifices on its underside for toffee to exit strands. A rotary toffee forming device is mounted beneath the orifice. This forming device is comprised of a pair of spaced parallel rods. Means is provided for rotating the rods relative to one another in a common rotative direction. Means is also provided for reciprocating the header back and forth relative to the forming device with the fine toffee strands being drawn from the orifices by the rotary movement of the rotary toffee forming device. The means for reciprocating the header serves to assist in causing the fine toffee strands to be distributed along the length of the rods on the rotary toffee forming device. Means is also provided for moving the core off of the end of the rotary toffee forming device in position for a saw, the saw being operable to sever the outer end of the core whereupon the core falls to a conveyor system. The conveyor system operates to move the severed cores in rows to a series of chocolate-coating baths. A first coating bath is provided for immersing the bottoms of the toffee cores in milk chocolate. A second bath is provided for flooding chocolate over the tops of the cores to ultimately completely coat the cores with chocolate. A cooling apparatus is then provided for cooling the chocolate-covered cores to place them in condition for packaging.

According to other features of our invention, we have provided a new and improved method for making milk chocolate-coated toffee candy pieces each having a hollow toffee core that is comprised of wound strands of toffee. A still further object of this invention is to provide an apparatus having vacuum means cooperable with the toffee header for pulling a vacuum in the header to prevent toffee from flowing through the orifices to shut down the apparatus.

Other features of the invention relate to a rotary toffee forming device that includes sets of pairs of threaded rods, and means for driving the rods in each set in a common direction for moving the cores axially off outer ends of the rods for severing.

A still further object of this invention is to provide a new and improved milk chocolate-coated toffee candy having hollow wound toffee cores comprised of wound strands and with the interior of the core having axial screw threads formed therein.

A still further object of this invention is to provide a new and improved apparatus for the manufacture of milk chocolate-coated toffee candy pieces wherein large numbers of candy pieces can be manufactured as part of a continuous operation whereby initially the toffee cores are made and thereafter the cores are chocolate-coated and then cooled and finally packaged.

According to certain method features of our invention a new method for milk chocolate-coating toffee candy pieces is herein disclosed. The method comprises the steps of heating a mass of toffee to a softened temperature sufficient to permit portions of it to be pulled from the mass. Then portions of the toffee are pulled from the mass in the form of fine strands and these strands are then caused to be wound at a toffee core forming area to form a continuous length of core. Contemporaneously, as the core is being formed by the winding or spooling of the strands, the thus formed core is also caused to move axially off the length of the core forming area while being cooled. As the formed core material leaves the core forming area, the outer cooled end is severed into predetermined core lengths by successive saw cuts to form successive toffee pieces or toffee cores. These cores are then conveyed to chocolate baths where the cooled toffee cores are immersed in a relatively hot bath of milk chocolate. According to other features of the invention, one bath is operated by directing a jet of warmed air against the coated cores to remove excess chocolate therefrom and thereby assisting in the formation of the chocolate bath beneath the cores. After the immersion, the cores are cooled and then they are packaged.

BRIEF DESCRIPTION OF THE DRAWINGS

FIG. 1A is a fragmentary side elevational view of one section of an apparatus or machine for the manufacture of candy;

FIG. 1B is a fragmentary side elevational view of another section of the apparatus or machine for manufacture of candy, being an extension of the section shown in FIG. 1A;

FIG. 1C is a fragmentary side elevational view of still another section of the apparatus or machine for manufacture of candy, being an extension of the section shown in FIG. 1B;

FIG. 4 is a top plan view with parts broken away illustrating the header and other components of the candy making machine;

FIG. 11 is an enlarged fragmentary partially sectioned view showing the manner of winding strands of toffee onto a candy former;

FIG. 12 is an enlarged fragmentary view taken on a line XII—XII looking in the direction indicated by the arrows in FIG. 11;

FIG. 13 is an enlarged fragmentary view of the drive arrangement for a candy former taken on the line XIII—XIII looking in the direction indicated by the arrow in FIG. 11;

FIG. 14 is an enlarged fragmentary view taken on the line XIV—XIV looking in the direction indicated by the arrow in FIG. 5;

FIG. 17 is an enlarged fragmentary view taken on the line XVII—XVII looking in the direction indicated by the arrows in FIG. 16;

FIG. 18 is a cross-sectional view taken generally along the line XVIII—XVIII of FIG. 17;

FIG. 19 is an enlarged fragmentary view taken on the line XIX—XIX looking in the direction of the arrows as seen in FIG. 15; and FIG. 20 is a vertical section through a piece of candy.

DETAILED DESCRIPTION OF THE PREFERRED EMBODIMENTS

Figure 2:
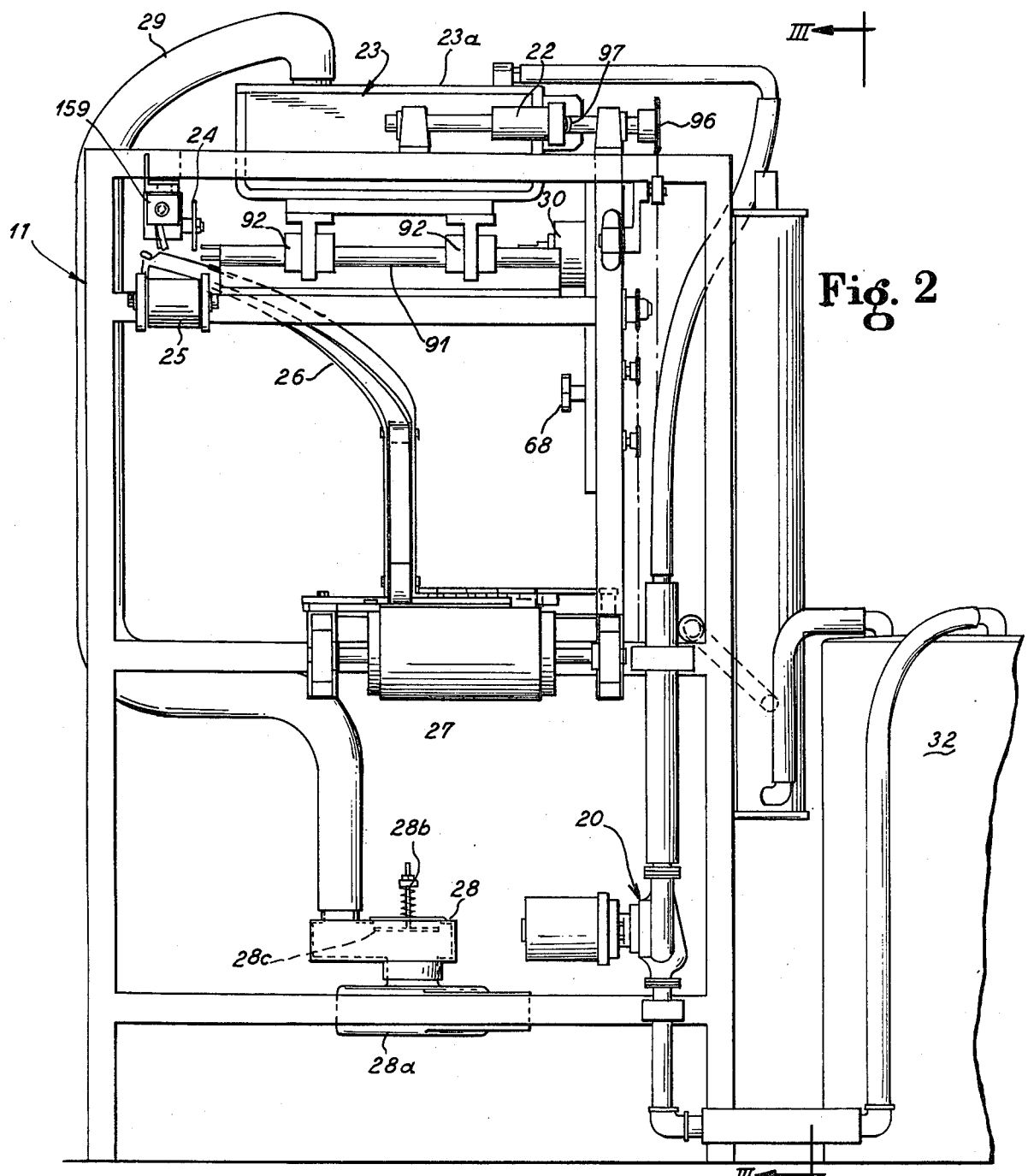
FIG. 2 is an enlarged end elevational view taken on the line II—II in FIG. 1A of the core forming unit.

FIGS. 1A, 1B, 1C show a complete apparatus or machine 6 for the continuous manufacture of chocolate-covered toffee candy 7 (FIG. 20). The candy has a toffee core 8 comprised of toffee strands 9 and a chocolate coating 10. FIG. 1A includes the core generating or the core forming section 11 of the machine and FIG. 1B includes the chocolate coating section 12. There are two coating steps, the bottom is coated first in a bath 13 and then there is a flooding of the chocolate over the top in an overhead bath 14. After the coating of the core then there is the beginning of the drying or the chocolate solidifying section 15 of the machine which extends over in the left and then FIG. 1C is a continuation of the solidifying of the chocolate utilizing air conditioners 16 and the like to keep it hard, and finally, at the end of the machine there is a discharge section 17. The air conditioners 16 are shown in FIGS. 1B and 1C, which are connected with the hardening section 15.

There is also an air conditioner 18 in the chocolate coating section. This serves the baths 13 and 14 by means of an interconnection between the two baths. The air conditioners 16 shown in FIG. 1B are positioned for operation after the coating of chocolate has been applied to the core 8 and to assist the chocolate in becoming hard. This figure also shows controls 19 for controlling the humidity as well as the temperature. Humidity is quite damaging to chocolate. As an example, where a chocolate box has been subjected to heat, it takes on a light whitish type of film and is very displeasing in color, so the environment of the chocolate must be controlled in order to maintain a nice appearing piece of chocolate. The whitish color change does not hurt the taste of the chocolate but it does cause the appearance of the chocolate to become less attractive.

As best seen in FIG. 2, a water heating system 20 is shown for controlling the temperature of the bulk toffee material 21 used in forming the cores 8 which is contained in an enclosed header or trough unit 23. An oscillating device 22 laterally reciprocates the trough 23 during the core forming operation. As a core section is formed they are advanced outwardly into the path of a gang of saws 24, which sever the core portions 8. A conveyor system 25 receives the severed cores 8 and moves them to a chute 26 which drops the cut core sections 8 onto a carry-away conveyor 27 for advancing the cores to the chocolate coating section. A unique vacuum system 28 including a vacuum line 29 for shutting down the flow of toffee in the core forming section 11 connected to the header 23 is provided when desired.

Figure 5:
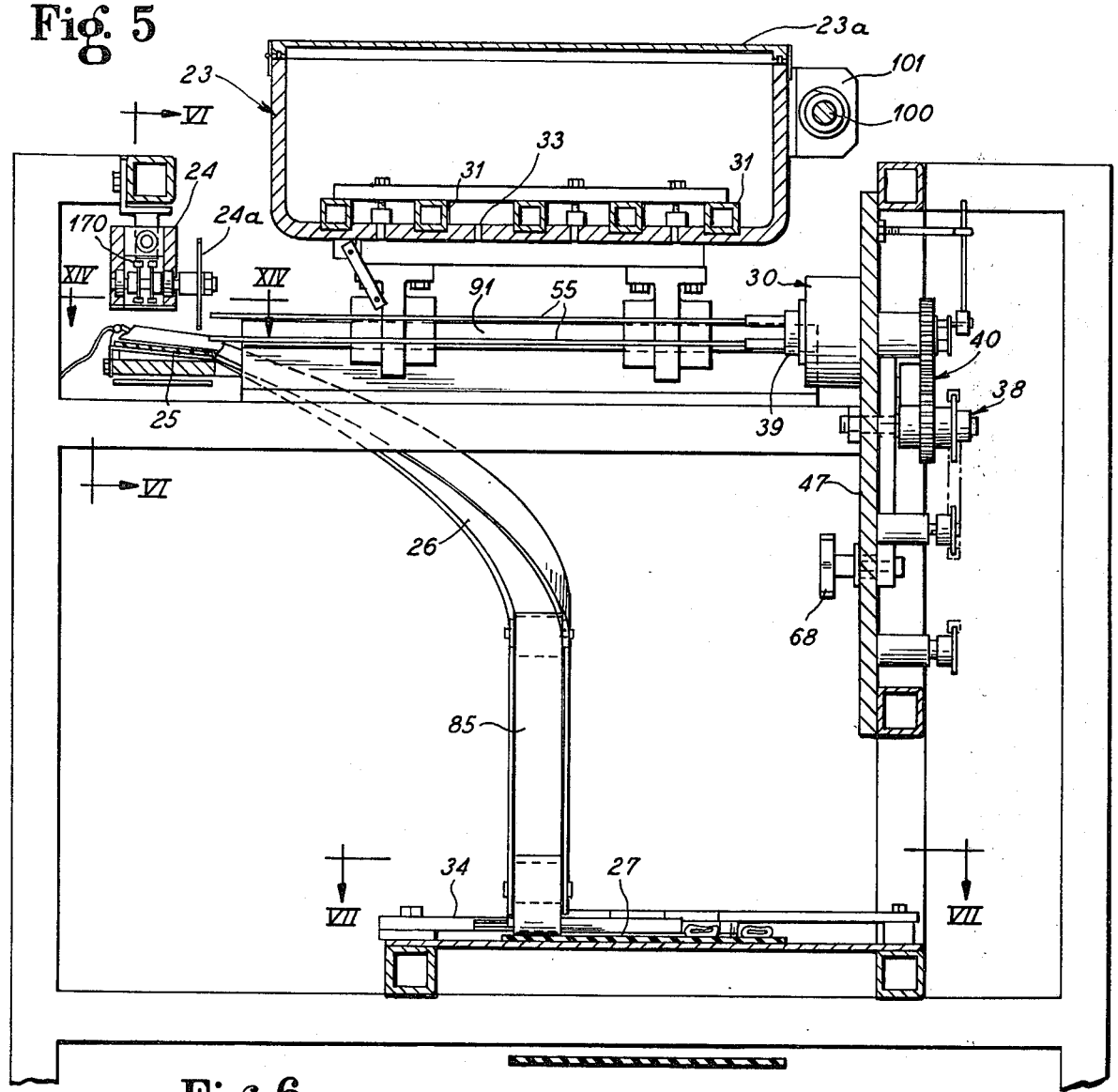
FIG. 5 is an enlarged cross-sectional view taken substantially on the line V—V looking in the direction indicated by the arrows as seen in FIG. 1A.

FIG. 2 shows the hot water system 20 for softening the core material which is further detailed in FIGS. 4 and 5 to show how water is distributed along the length of the header or trough 23 by way of conduits 31 and then recirculated back to a hot water heater 32 of the system 20.

In FIGS. 4 and 11 toffee discharger holes or orifices 33 are shown arranged in sets, through which orifices the toffee flows whereafter the toffee is continuously drawn into thread-like strands and wound into cores in accordance with the invention. The holes 33 are similarly sized and similarly angularly positioned for better distribution of the strands 9, when wound onto core forming units 30. Preferably the orifices are of a $\frac{3}{8}''$ diameter and are spaced apart from the centerpoint to centerpoint a distance of 9/16" and the centerpoints of each set are disposed at a 7° angle relative to a horizontal line through the header co-axially orientated relative to the core forming units 30. In operation, the toffee is heated to a point where strings of toffee may be pulled from the toffee mass 21, in the overhead header 23 through the orifices 33. Now those strings will be continuous and the winder will continuously pull strings of toffee through the holes 33 and then wind the strings to form an elongated core member from which the individual core portions 8 are cut. Excellent results are obtainable where the core strands on the core after being cooled have a diameter of 0.010" to 0.012". Now if the temperature of the toffee is properly controlled in the header in the range of 172° to 180° F., it will allow strings to be pulled through the orifices having a sufficient thickness to prevent breakage while providing an ideal core configuration. The entire header or trough unit 23 oscillates laterally so that the toffee material can be wound on the core forming units along their lengths rather than just in one area. As the trough oscillaters back and forth, a criss-cross pattern is generated to allow a better lay of the material for core forming.

Figure 7:
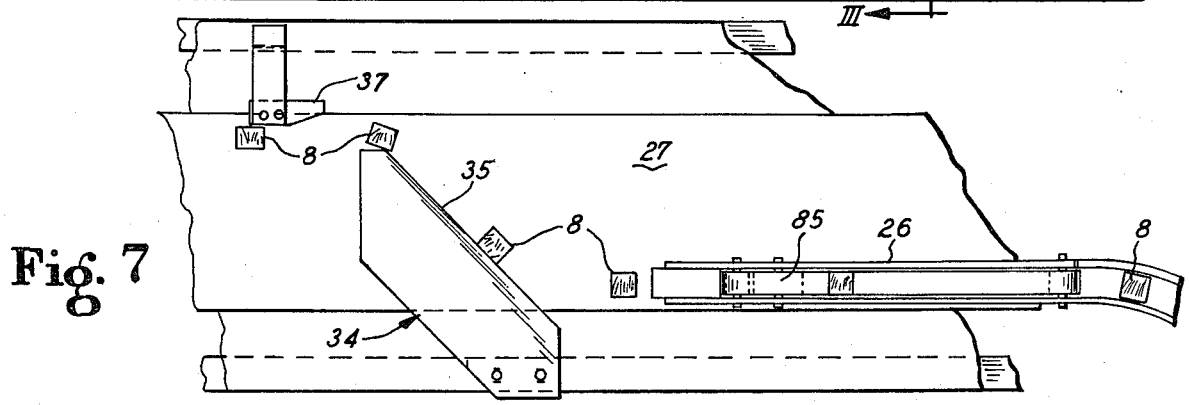
FIG. 7 is a sectional view taken generally along the line VII—VII looking in the direction indicated by arrows in FIG. 5.

FIG. 7 shows a sectional view along the top of the carry-away belt 27 upon which the core sections 8 are deposited. It shows a plow system 34 which arranges the core members 8 in a row. At the time of severence of the cores from the core forming device, the material at the axially outer end of the core forming units 30 has a temperature about 10° to 20° F. above room temperature which is desirable as it is easier to saw the spun toffee when cooled. Now at each core forming station after the core members 8 are cut from the formed length of core material, conveyed over to the chute 26 and then dropped down onto the main carry-away conveyor 27, they move into contact with a plow 35. The plow 35 urges the cores 8 laterally across the width of the belt 27 and generally arranges them in a single aligned row disposed at a generally uniformly spaced intervals along the length of the conveyor 27.

At the next core forming station, of course, the plow member 35 is shorter to deposit a second row of cores 8 on the belt 27 alongside the first row of cores 8 with each successive core forming station similarly producing a row of cores 8. In the present embodiment 6 rows of cores 8 are placed in side-by-side relationship along the width of the carry-away belt 27 (FIG. 1A). The same reference numerals identify identical components as already described at each of the core forming stations.

It will be noted there are two plows arranged to operatively coact in pairs to allow for the orientation of the bits or cores in a row and these plows have been marked for identification as plow 35 and plow 37.

Figure 3:
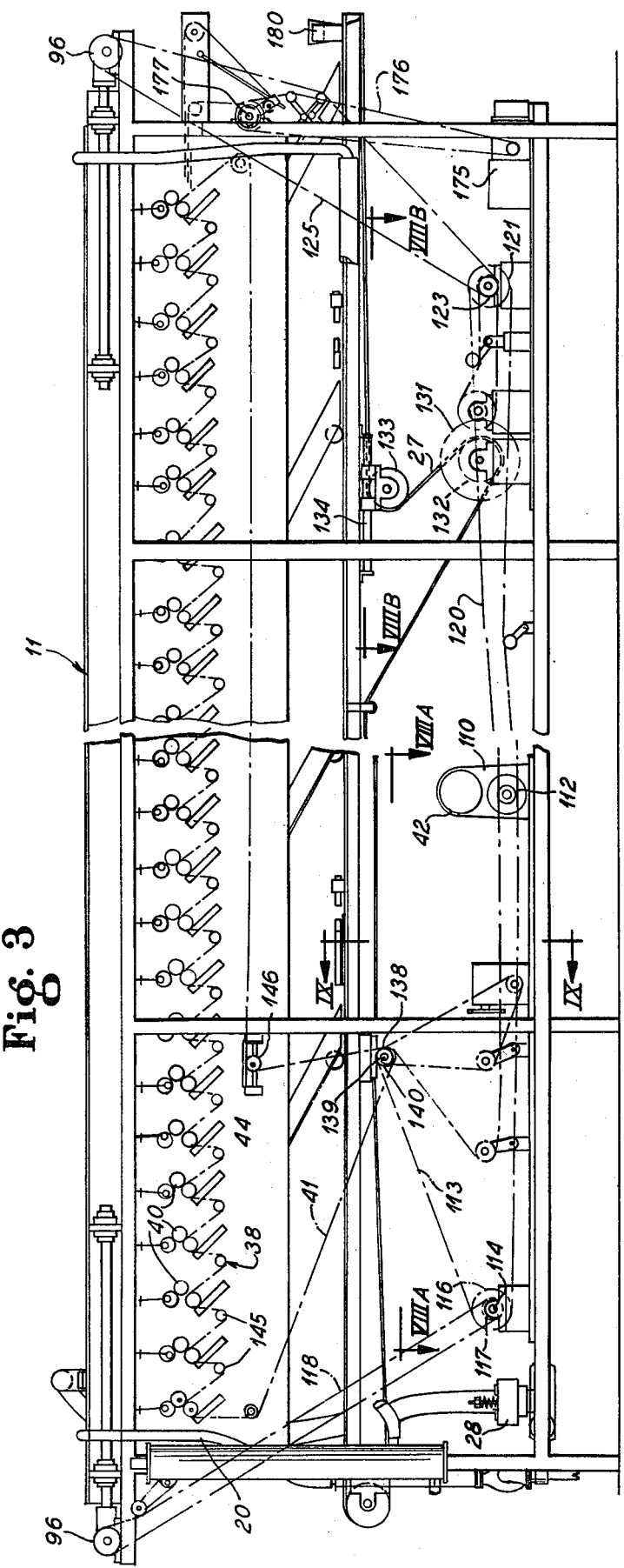
FIG. 3 is an enlarged fragmentary side view of the candy making apparatus or machine as viewed on the line III—III looking in the direction indicated by the arrows shown in FIG. 2.

FIG. 3 is a side elevation as viewed from the opposite side of the core generating device or core forming section 11 as seen in FIG. 1A. This figure shows a core forming unit driving arrangement 38 for driving a winding mechanism 39 associated with each of the core forming units disposed in spaced relation along the length of the section 11.

The core winding mechanisms 39 are each driven by a set of gears 40 which are driven in synchronization by a chain 41. The chain 41 in turn is driven from a main drive motor 42. This motor provides a power source to drive most of the driven components of the machine.

As best seen in FIG. 13 a sprocket 44 associated with each winding mechanism 39 is driven by the drive roller chain 41 with a first gear 43 drivably connected to the sprocket 44 for rotation therewith. An idler gear 45 meshes with the gear 43 and in turn drives a gear 46 keyed to a hub 50 of the winding mechanism 39.

The detailed structure of the winding mechanism 39 is best shown in FIGS. 11 and 13. The hub 50 is rotatably supported from a frame plate 47 and carries a pair of small spaced sprocket members 51 and 52 for rotation therewith. A chain 53 (FIG. 13) extends between the sprockets 51 and 52 and meshes with a third small sprocket 54 also carried on the hub 50.

Each of the sprockets 51 and 52 is carried on a threaded core winding rod 55 extending outward below the header 23 upon which the toffee cores are wound. When the hub 50 is rotatably driven by the set of gears 40 the threaded rods 55 rotate along with the hub 50 as shown by the arrows 59 in FIG. 12 to wind up the toffee strands thereon. Further each of the rods 55 is caused to rotate about its own axis to feed the formed core members outward whereby core portions 8 may be cut off by the gang of saws 24. As the hub 50 rotates it carries the three small sprockets 51, 52 and 54 therewith about the axis 60 (FIG. 13). The sprocket 54 is pinned to a sleeve member 61 which is provided with a rod 62 extending upward and retained by an eye bolt 63 to restrict rotational movement of this small sprocket. Accordingly, since the sprocket 54 cannot rotate about its axis on its supporting bolt 63 the mating chain 53 "walks" about the sprocket 54.

The eye-bolt 63a only allows the rod 62 to move up and down so that as the bolt 63, carrying the small sprocket 54, orbits about the axis 60 of the hub 50, it drives the chain 53 which drives the gears 51 and 52. Thus the gears 51 and 52 rotatably drive core winding rods 55 which pass through the hub and extend underneath the trough unit 23 to receive the strands or strings of toffee 9. Thus it will be seen that the rods 55 orbit about the axis 60 of the hub 50 and also rotate about their own axes to provide pulling and winding action relative to the strands 9 and provide an outward feed of the forming core body to produce uniformly wound toffee cores 8 when cut from the core body.

The sprockets 44 for driving the winding mechanisms 39 as shown in FIGS. 11 and 13 are each carried on a stub shaft 65 secured to the frame plate 47. A clutching arrangement which includes a bell crank member is also carried on the stub shaft 65 and provides a pivotal support for the idler gear 45. Thus the idler gear 45 can be pivoted around the axis of the stub shaft 65 into and out of engagement with the gear 46 that is in drivably connection with hub 50 which carries the core-winding rods 55. By moving an idler gear 45 out of mesh, with a related gear 46, any of the core-winding mechanisms 39 may be rendered inoperative. Thus, when a problem develops at one station, it may be corrected without shutting down the entire machine. When one station is shut down, there is of course an interruption or change in the number of finished core pieces that are fed onto the carry-away belt conveyor 27 but this does not otherwise have any affect on the machine's operation.

To effect disengagement between the gears 45 and 46, a downward extending arm 67 provides for pivoting the bell crank about the stub shaft 65. Herein a clamping screw 68 carried in the arm 67 extends through a hole 69 in the frame plate 47 to give clutching access from the front of the machine. Thus, by loosening the adjusting screw 68, as shown in FIG. 11, a machine operator is able to swing the bell crank 67 with the gear 45 about the stub shaft 65 to declutch the winding mechanism 39. The hole 69 will allow sufficient movement of the screw 68 to disengage the gears 45 and 46. The gears are shown engaged in FIG. 13 as illustrated by the solid lines and are shown disengaged by the broken or phantom lines.

The drive to each core-winding mechanism 39 is controlled by this means from a front side of the machine which is the core generating side of the machine. The backside of the machine (FIG. 3) includes all the drive mechanism for the core forming mechanism 11.

In view of the previous description it will now be realized that the hub members 50 are journalled as seen in FIG. 11 in bearings 70 and are driven by the gear arrangements 40 in the drive system on the back side of the machine. Also, the rods 55 extend through the hub 50 and rotate with it. The arrangement of the small sprockets 51 and 52 on the back face of the hub 50 are driven by the small chain 53, which small sprockets impart rotational movement to the two rods 55 with the ends of the rods extending under the trough 23 and are rotated in a direction to wind up the toffee strings about the two rods and the rotation of the rods about their axes tend to feed the material off the rods in a direction away from the drive arrangement and towards the face side or front of the machine (FIG. 1A).

Each laterally aligned series of holes 33 in the trough bottom serves to contribute toffee layers to the core as it is rotating and moving to the cut off area at the left as seen in FIGS. 11, 12 and 14. Each toffee core 8 is thereby formed of a large quantity of strands 9 one on top of the other with a hollow center.

With the oscillation of the toffee trough unit 23, the toffee strands 9 are laid down in a generally criss-cross pattern to generate a build up of wound toffee core members.

As the strands are wound about the cooperating rods 55, and the toffee core members are advanced to the left beyond the rod 55 ends as seen in FIG. 14 in broken line position 8a, the gang saw device 24 is activated to separate the cores 8 from the main body of formed cores. The gang saw device comprises a series of small suitably driven and supported saw blades 24a which advance to cut off the tubular cores 8 as shown in FIG. 14. After a core 8 is cut off, the gang saw device 24 is retracted to allow the next core 8 to develop in length and the process is repeated. The gang saw device 24 is triggered by a camming arrangement as hereafter described.

When the core or core section 8 is severed from the main core body, it falls onto a belt 73 of the conveyor system 25, immediately below and then moves downstream into contact with angled plate 74. It should be remembered that a series of cores are cut off at the same time, and are advanced toward the plate 74 in spaced relationship along the belt. The arrows 75 on the belt 73 show the direction of the core flow and the arrow 76 shows the movement of one saw blade 24a from its ready position shown in dotted lines to its cut off position as shown in solid lines in FIG. 14.

The angled plate 74 urges the core 8 toward a chute entrance 78 of the chute 26. An air jet or air nozzle 80 co-acts with the angled plate 74 to move the core 8 over into the chute 26.

Figure 6:
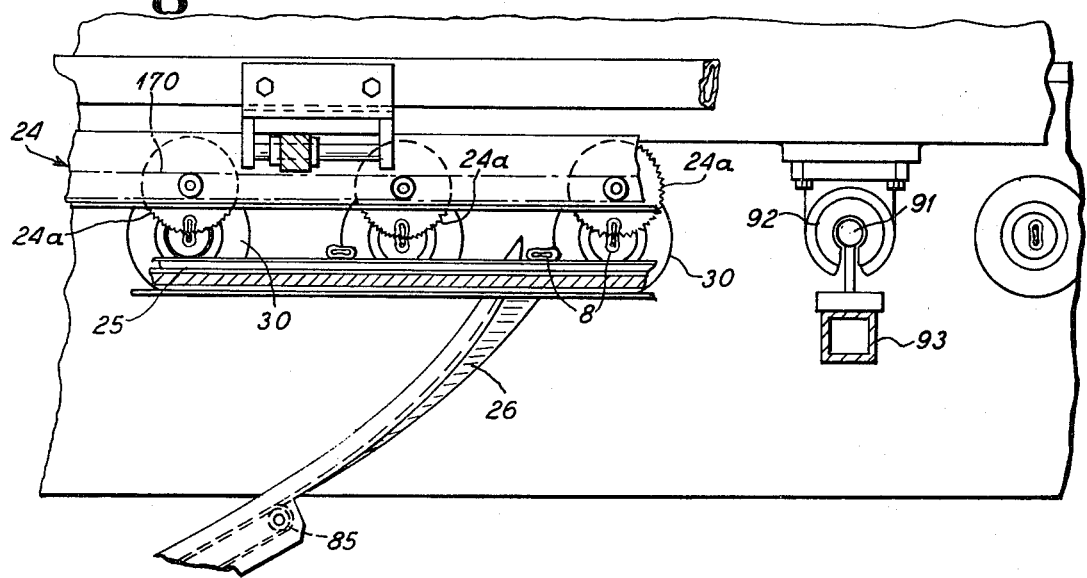
FIG. 6 is an enlarged fragmentary view taken on the line VI—VI looking in the direction indicated by the arrows as seen in FIG. 5.

The chute 26, as best seen in FIGS. 5 and 6 angles downward and rearward and is provided with an idler belt 85 to control the final decent of the core. Accordingly, at the top of the chute 26 a core 8 is allowed to freely slide downward until the midway point when the core will slide onto the idler belt 85 and therewith descent at a rate in accordance with the belt travel since the belt 85 is driven by contact with the main carry-away conveyor the speed of descent of the cores 8 equals the speed of the carry-away belt. FIG. 7 is a top elevational view showing a series of the core members 8, moving down the chute 26 and being positioned in a row along one side of the carry-away conveyor 27. Then, as covered before, immediately down stream of the chute 26, there is provided a plow system 34 which angles the cores over to its proper position on the carry-away conveyor. A series of plows of different lengths are provided so that each of the chutes deposits a row of core portions 8 along the lengths of the carry-away belt. In this way the cores are accurately spotted in rows across the width of the conveyor. This is important so that the cores do not become too closely grouped together or overlap for passage into the chocolate coating section that follows. FIG. 7 illustrates the positioning of the first upstream plow system 34. The next plow system would be somewhat shorter and would establish the second row and the third plow system somewhat shorter yet and so on. It can be seen from FIG. 1A that there is a series of the chutes and each one has its own set of plows and defines a separate row for moving core members downstream.

A very important feature of this invention involves the means of keeping the bulk material consistency just at the right point since the strands 9 will break or will not pull off properly without adequate controls, so it is rather crucial that the consistency of the toffee be maintained within fairly close limits. To this end, the water heater system 20 circulates hot water through the trough unit 23 in order to maintain the consistency of the bulk toffee material 21. The trough unit 23 oscillates back and forth, that is from left to right as viewed in FIG. 2 by the oscillation mechanism or device 22. The oscillation movement serves to even out the build-up of the toffee strands on the rods 55. In operation, the trough unit 23 is totally enclosed by a top 23a to seal it from the ambient.

The trough unit 23 is mounted for lateral reciprocity movement as seen in FIGS. 5 and 6 on support rods or guides 91.

Linear type of bearing or a ball bushing 92 carry the trough unit 23 along the support rods 91. The support rods are secured to cross frame members 93. The trough 23 is supported on the support rods 91 at each end of the unit 11 and also at an intermediate position. The oscillating devices 22 for reciprocating the trough unit 23 each include a spooler screw sprocket 96, which is connected to a spooler screw 97 drivably carrying a spooler member 98. The member 98 is carried by the trough unit 23 and travels back and forth along the length of the spooler screw threads as the spooler screw 97 rotates. A spooler drive arrangement is provided at each end of the trough unit 23 with the spooler members 98 attached to the trough by means of brackets 99 with the spooler members 98 attached to the trough by means of shafts 100 extending along one side of the trough unit 23 which are secured to the trough unit 23 by means of pillow blocks 101. The pillow blocks 101 provide a non-rigid connection to the trough unit 23 while the shafts 100 permit a double connection to the side of the trough unit 23 so that bending moments are not quite so severe in translating the trough unit 23 back and forth. Thus it will be seen that the shaft pillow block mounting arrangement to the trough unit 23 can compensate for slight misalignments between the driving and support elements associated with the trough unit 23.

As stated before, the trough unit 23 is totally sealed from the ambient by means of a cover 23a secured to the top which form a part of the vacuum system 28. At the time of shutdown, at the end of the shift or the end of the day, the bulk toffee material 21 will still slowly flow out of the extrusion holes 33 and it is not a simple matter to turn the flow of toffee off. To compensate for this problem, a vacuum blower 28a connected to the cover 23a by means of the vacuum line 29 draws a vacuum to thereby subject the interior of the trough unit 23 to a vacuum to stop the flow of the toffee 21 through the orifices 33. The air pressure at the bottom of the trough will resist the sagging of the toffee through the orifices 33.

The vacuum system 28 is turned on at the shut-down of the shift and sufficiently long to allow this unit to cool off so that the toffee will no longer sag until it takes a set so it cannot leak out through the toffee discharge openings 33.

An adjustment means 28b (FIG. 2), is provided to control the vacuum developed in the trough unit 23. It includes a spring-biased gate 28c which will allow some air to enter from the ambient so as to adjust the level of vacuum in the enclosed trough unit 23.

DRIVES

Figure 8A:
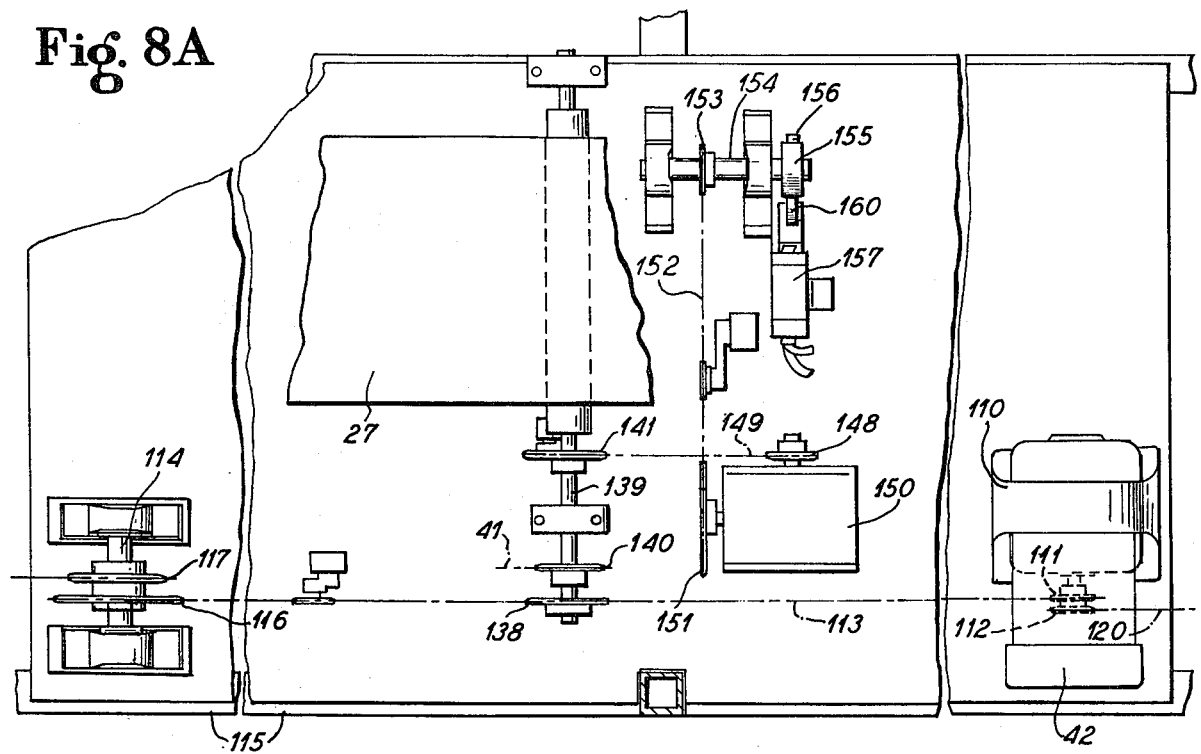
FIG. 8a is a sectional view of the drive arrangement taken generally along the line VIII-A—VIII-A in FIG. 3.
Figure 8B:
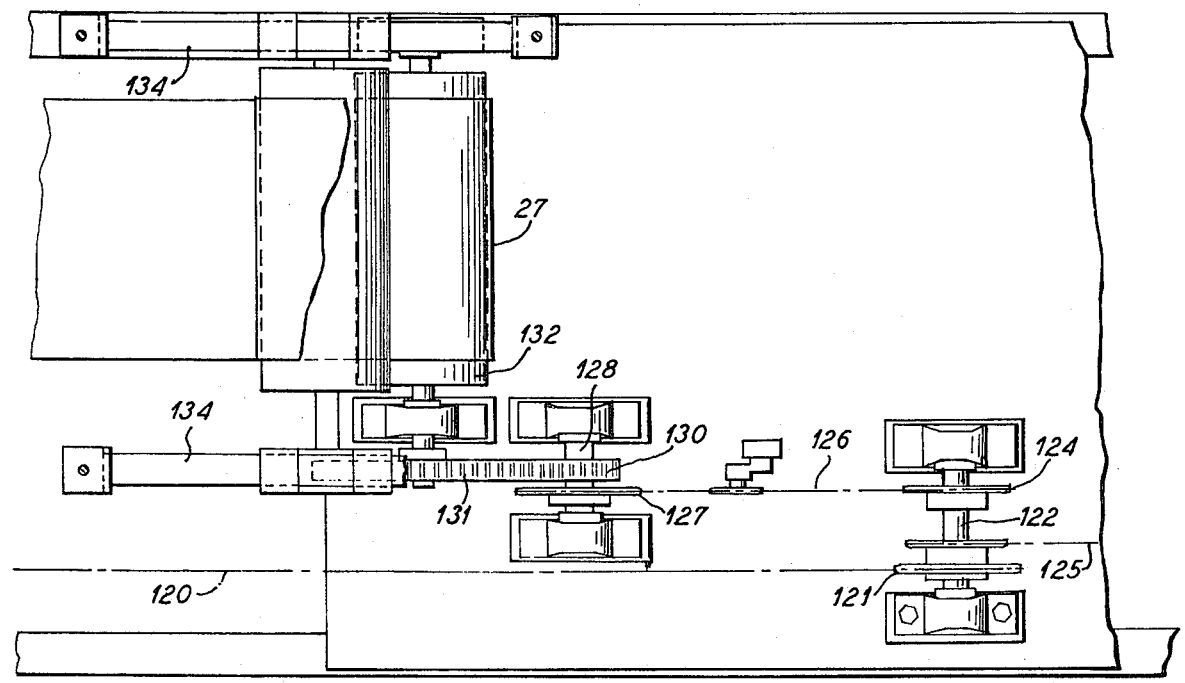
FIG. 8b is a cross-sectional view on the line VIII-B—VIII-B of FIG. 3.

The machine 11 and practically all of the components are powered from the drive motor 42 which incorporates a speed reducer 110 as seen in FIGS. 3 and 8A. The speed reducer 110 is provided with a pair of drive sprockets 111 and 112. The sprocket 111 is arranged to drive the various components to the left of the machine as seen in FIG. 3, and the sprocket 112 drives the components at the right. Each of these sprockets 111, 112 is effective for powering the oscillating device 22 for the trough unit 23, namely the spooler screw sprockets positioned at opposite ends of the core forming section 11. Herein, a roller chain 113 driven by the sprocket 111, powers a short shaft 114 mounted on the frame structure 115. There are two sprockets 116 and 117 mounted on the shaft 114. The sprockets 116 receives the input drive from the speed reducer drive unit 110, and the sprocket 117 is connected by means of a roller chain 118 to the sprocket 96 which drives the spooler screw 97 at the left of the section 11 as seen in FIG. 3. A chain 120 extending to the right side of the section 11 connects between the sprocket 112 and a sprocket 121 as seen in FIGS. 3 and 8B. The sprocket 121 is mounted on a short shaft 122 which also supports a second sprocket 123 and a third sprocket 124. The sprocket 123 drives a roller chain 125 which drives the spooler screw sprocket 96 at the right side of the core forming section 11 as seen in FIG. 3. By means of these two chain arrangements both spooler screws 97 are rotated in synchronism with each end of the trough being driven in an oscillatory manner by the spooler screw oscillating device 22. The sprocket 124, as seen in FIG. 8B, on the shaft 122 drives a roller chain 126 which is drivably connected to another sprocket 127. The sprocket 127 is mounted on a short shaft 128 which is rotationally mounted on the frame structure 115 and carries a gear 130. The gear 130 meshes with a large bull gear 131 and rotatably drives a large drive roller 132 for driving the main carry-away belt. The carry-away belt 27 is thus driven in synchronization with the rest of the operations. The movable components operate in a synchronized pattern so that there is an optimum cooperation between all the elements.

A second roller 133 positioned above the drive roller 132, is mounted for belt take-up movement on a pair of slide bass 134 to compensate for belt slack.

As best shown in FIG. 3, the roller chain 113 in addition to driving the short shaft 114 also drives a sprocket 138 carried on a cross shaft 139. The sprocket 138 rotatably drives the cross shaft 139 along with a pair of sprockets 140 and 141 mounted thereon (FIG. 8A). The sprocket 140 drivably meshes with the chain 41 which is effective to drive the core winding mechanisms 39 by means of the set of gears 40 as previously described (FIG. 3).

The chain 41 meshes with each of the sprockets 44 associated with the sets of gears 40 using a series of idler sprockets 145 (FIGS. 3 and 13) to provide a suitable drive wrap.

The chain 41 extends from the drive sprocket 140 up into engagement with each cooperating set of sprockets 44 and 145 and then proceeds back to the cross shaft in a closed loop that drives each of the winding mechanisms 39 in a synchronized fashion. A chain tightener device 146 is provided to take-up chain slack up which is positioned immediately above the cross shaft 139.

Besides driving the sprocket 140, the cross shaft 139 also drives the sprocket 141 which drives a sprocket 148 by means of a chain 149. The sprocket 148 provides a power input to a right angle drive 150 (FIG. 8A). A power output sprocket 151 from the right angle 150 drives roller chain 152 connected to a sprocket 153 which is rotably mounted on a shaft 154. The shaft 154 carries a cam wheel 155 which is arranged to periodically activate a fluid valve 157 to direct operating pressures to a cylinder 159 (See FIG. 4). With each rotation of the cam wheel 155, a lobe 156 carried thereon comes into contact with a roller 160 causing the valve 157 to direct pressurized fluid to the cylinder 159 for extending it.

Note the cylinder 159 is operably connected to the gang saw device 24 which periodically advances the saw blades 24a to sever a core section 8 extending from each of the winding mechanisms 39. The timing of the cutting action thus determines how long a core can develop in length. With each 360° rotation of the cam wheel 155 air pressure is caused to flow to cylinder 159 for extending it in a cutting operation. The valve 157 reverses the fluid connections to retract the gang saw device 24 after the lobe 156 moves away from the roller 160.

The saw blades 24a are running constantly (FIG. 4) being driven by a small electric motor 165 which has an output sprocket 166 driving a sprocket 167 by means of a chain 168. The sprocket 167 is connected to the drive arrangement 170 for the gang saw device 24 to drive the blades 24a while the gang saw device 24 reciprocates.

Each of the saw blades 24a of the gang saw device 24 are driven in unison, so that they all rotate in the same direction and, of course, at the same speed.

Figure 10:
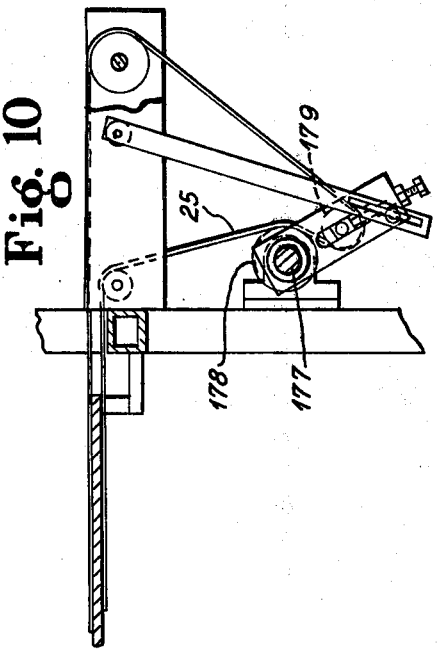
FIG. 10 is a fragmentary cross-sectional view taken on the line X—X looking in the direction indicated by the arrows as seen in FIG. 4.
Figure 9:
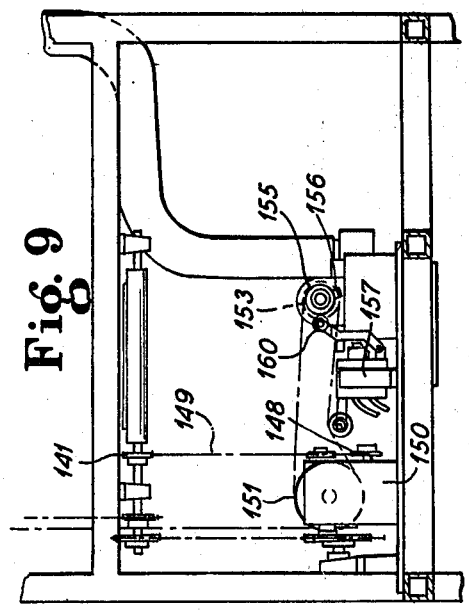
FIG. 9 is an enlarged fragmentary view as seen on the line XI—XI looking in the direction indicated by arrows in FIG. 3.

Now, with particular references to FIGS. 3 and 10, it will be seen that the conveyor belt 25 is driven from a separate drive motor arrangement 175 by means of a roller chain 176 which drives a cross shaft 177 having a belt drive pulley 178 connected thereto. Now the pulley 178 makes contact with the conveyor belt 25 that is used in transferring the core members 8 to the chute 26.

As seen in FIG. 10 a sufficient driving wrap of the belt 25 around the pulley 178 is provided by an adjustable roller 179.

After the cores 8 are formed, cut and positioned in rows on the carry-away conveyor 27 for transport out of the core forming section 11, the cores 8 are passed under a heater device 180 (FIG. 3). The heater device 180 is primarily intended to soften any random strands that protrude from the core and to somewhat knit the core together in a more stable configuration to make the cores less delicate.

Summarizing the heater device 180, flash heats the core so that there is a surface melting and this in effect welds and smoothes over some of the loose frayed ends or welds little portions of exposed strands to the rest of the core to knit the whole core together to increase its stability for operations that are going to follow. If any so-called "wild ends" exist, the heating would also tend to dispose of them by melting them or laying them down so that when the core went into the chocolate coating area these so-called "wild ends" would not project through the chocolate.

Conveying and Coating

In FIG. 1A at the end of the carry-away conveyor 27, as shown on the left side of the figure, there are a series of rows of the cores 8. The cores continue to move along on a second short intermediate conveyor member 190 that feeds the cores 8 over to the bottom chocolate coating area of the first bath 13, at the right on FIG. 1B. Now the first step in coating the cores 8 with chocolate comprises running the cores through a bath of chocolate so that the bottom surface becomes coated. There is a rod-like belt 191 conveying the cores 8 through a chocolate pool 192 with only the bottom of the core 8 dipped into chocolate. The chocolate coating operation occurs while the cores are on the moving belt 191 in side-by-side relationship. The bath, although shallow, gives a good bottom coating to the core in preparation for the top coating step that follows. The cores 8 thereupon immediately proceed onward to the left in FIG. 1B onto a conveyor 193 and into an area where the air conditioner 18 is effective to solidify the chocolate.

Figure 16:
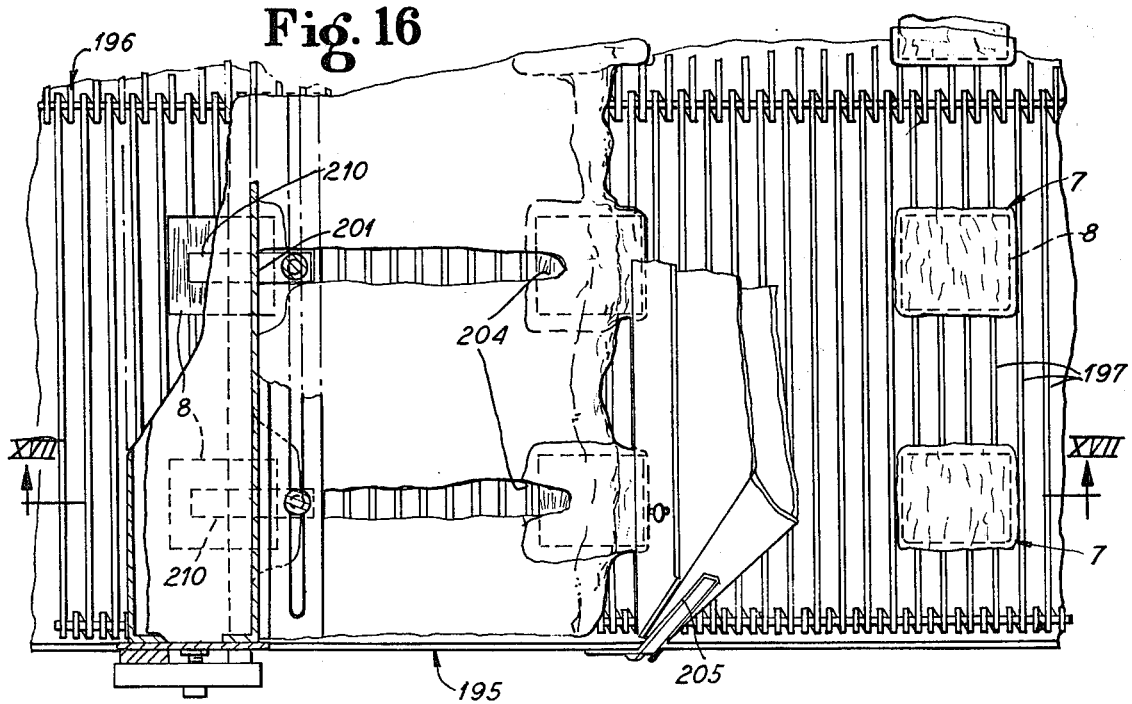
FIG. 16 is an enlarged fragmentary view taken on the line XVI—XVI looking in the direction indicated by the arrow in FIG. 15.

The cores 8 travel along the conveyor 193 and into the overhead chocolate bath unit 14 at which point they are transferred unto a core-coating conveyor 195 having a rod-like belt 196 similar to the belt 191 (See FIG. 16).

The rod members 197 of the belt 196 are interconnected to define an endless belt, carrying the cores 8 through the bath unit 14. The belt 196 is suitably driven and is sufficiently flexible to go around relatively small end rollers 198, 199. The spacing between the rods 197 provide passage ways through which excess chocolate may flow through in returning to a chocolate reservoir 200.

The chocolate coating operation is accomplished in stages so the chocolate will completely cover the cores 8 upon completion of the coating operations.

After the cores 8 have passed through the chocolate pool 192 and the bottoms of the cores are coated, the cores then pass through a second or overhead chocolate bath 201 which causes chocolate to flow from above over the cores. It will be observed from FIG. 16 that there is an interruption in the flow of chocolate at the center 201 of the cores 8 so that there is a break in the chocolate coating down the middle of each core piece. In order to effectively produce this coating interruption down the middle of each piece, it is important to maintain the alignment of the cores in rows during the entire coating operation. Thus, the chocolate flow is not over the entire top surface of the core, but on the sides of the core, leaving a strip or stripe down the center which is temporarily left open and free of chocolate to allow heated air to escape to prevent a slight build-up of air pressure inside of the core which would otherwise tend to rupture the chocolate coating 10. Immediately after the interruption 204 has been produced, the core is then transported downstream on the belt 196 to pass under a nozzle 205 which blows against the top surface of the core to cause the chocolate to be evened-out across the top surface thereof to generate a more or less uniform chocolate coating over the top of the cores 8. This blowing operation also serves to thin out the chocolate and to remove excessive amounts of chocolate from the cores. It will be appreciated that the air blown against the soft chocolate also generates a rippled surface on the exterior of the coating 10. The excess chocolate, as seen in FIG. 17, is allowed to drip between the conveyor rod members 197 and drop back into the chocolate reservoir 200. A conventional chocolate elevating system 206 is utilized to load chocolate into the overhead bath 201.

Now immediately underneath where chocolate is laid down and continuing just past the point where air is blown over the surface of the coating 10 for evening and spreading the chocolate on the core, there is a plate 207 (See FIG. 17) underlying the rod-like belt 196 which allows a puddle 209 to develop so that a proper coating 10 can develop. This arrangement prevents the chocolate from falling away too quickly so that the jet of air achieves the desired evening effect. The puddle 209 in between cores 8 being coated is retarded in its downstream movement with the conveyor 195, by the air flowing from the nozzle 205. Herein, the chocolate mounds up in height (FIG. 17) by the force of the airstream directed against it in order to overflow and cover the uncoated center portion 204 of the cores 8. Thus, it will be seen that the air nozzle 205 is also effective to retain a suitable volume of chocolate on the plate 207 to complete the coating process as well as evening-out the coating 10, as shown in FIG. 16. The chocolate bath is maintained in a heated condition so that the coating operations are conducted with a liquefied chocolate. Suitable controls are provided for maintaining this condition which are known in the art (FIGS. 16–20).

According to features of our invention, a small plate or band 210 is positioned below a chocolate emitting slot 211 of the overhead bath 201. These plates or bands 210 function to limit chocolate flow at each core position to keep the chocolate clear of the core centers until the cores move downstream into the path of the air jet. The uncoated center area on each core 8 allows the gases to emit from the interior of the core.

Figure 15:
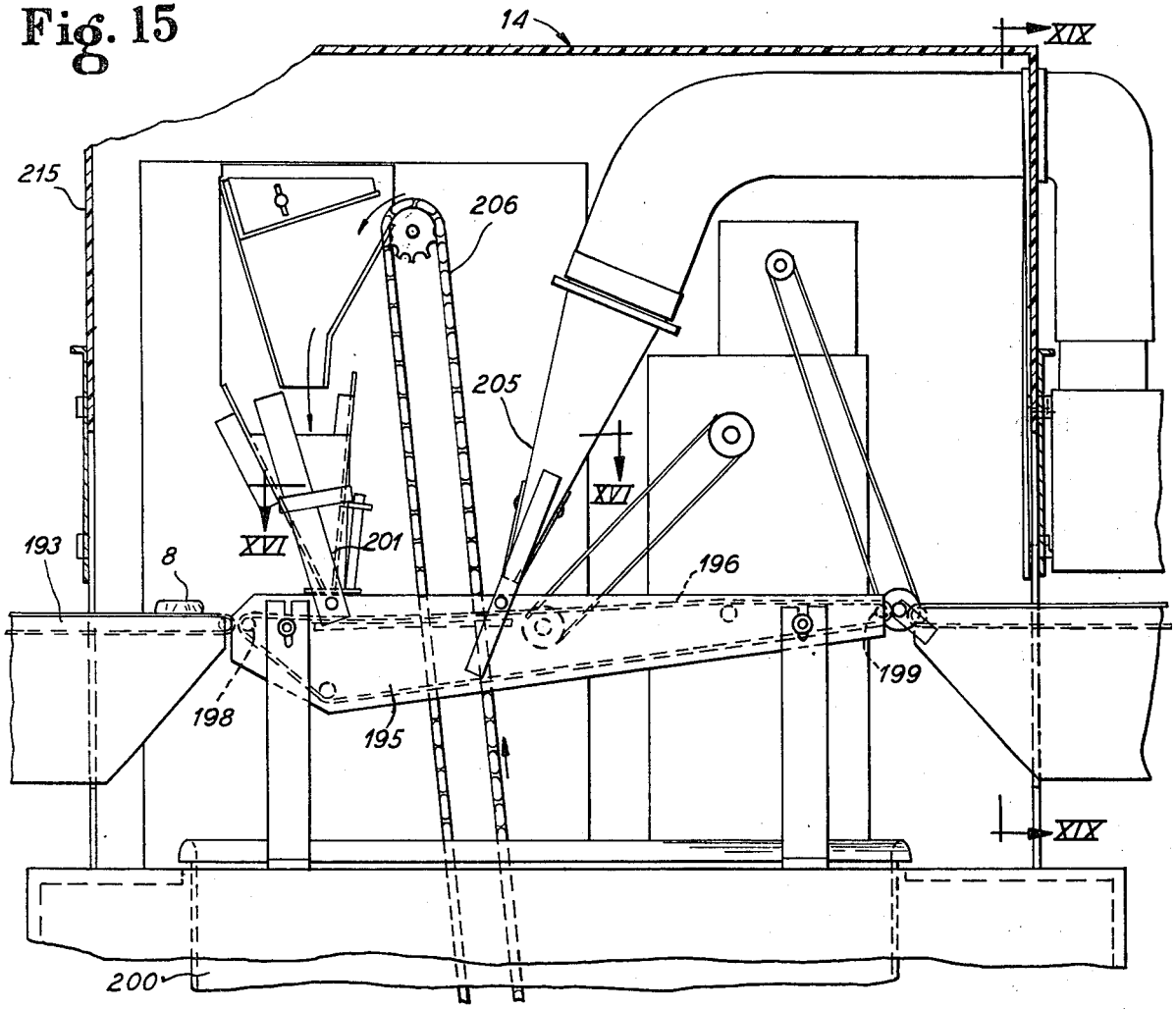
FIG. 15 is a side elevational view of the chocolate-coating apparatus shown in FIG. 1B.

FIG. 17 shows the cores 8 of the toffee in three positions. One position shows the core immediately below the slot 211 of the bath 201 where the chocolate is being deposited. A second position is a core below the nozzle 205 where the chocolate is being spread over the center gap as well as being thinned down. The third core position over at the right side of the figure shows the finished chocolate candy 7 where the coating 10 has been thinned down and provided with a wrinkled effect which enhances the appearance as well. Standard precautions against temperature change must be taken and to that end an enclosure or chamber 215 (FIG. 15), enables the air temperature to be maintained.

The air conditioner 18 is connected by means of a conduit 216 to the chamber 215 (FIG. 1B). The force of air pressure coming from the nozzle 205 is regulated by a damper arrangement 218, as seen in FIG. 19, to control the inlet opening 219 of the blower 217. After the cores 8 have been coated, the candy pieces 7 pass to a cooling tunnel 220 of the solidifying section 15, which is seen in FIGS. 1B and 1C. A pair of air conditioner units 16 control the humidity and temperature in the cooling tunnel 220 so the candy 7 will harden to the point where they can be handled at the discharge section 17 of the cooling tunnel 220 (FIG. 1C).

The packaging or boxing zone for the candy 7 is shown at the extreme left hand side of FIG. 1C. FIG. 20 illustrates a typical cross-sectional view of a piece of candy 7 manufactured in accordance with the concepts of our invention; the core portion 8 having a bottom coated chocolate layer 221, and a top and side layer 222 comprising the complete chocolate coating 10.

The diameter of each formed strand 9 can be made quite thin on the order of about 1/64". The formed cores 8 have a brittle characteristic and are sensitive to the touch. Thus, it is important to position the cores accurately on the conveying systems without being jostled and also the reason why the cores descend down the chute with the belt rather than being permitted to fall down. The woven strands of the core having an approximate 1/64" diameter provide the core with a light crushable quality for when it is placed into the mouth between a person's teeth.

There is a lot of air space in the core and it does give the core a nice crunchiness. Of course the core does deteriorate with exposure to air when stored for some months, whereupon it may start to dissolve. As soon as the chocolate coating surrounds the core the core is effectively hermetically sealed to keep the atmosphere and moisture away from the core, so the chocolate coating maintains the strand integrity of the core once it is coated. Another characteristic of the core is that there is a double screw thread impression generated on the interior of the core in the area where the strands were wrapped around the winding rods 55.

The core members with their screw threads in effect form a nut on the two rods 55 to permit the core to be unscrewed from the ends of the rods for feeding the core out into the path of the saw blades 24a that sever undivided core portions 8 from the main body core material after being formed on the rods.

We claim as our invention:

1. A method of manufacture of milk chocolate-coated toffee candy pieces comprising heating a mass of toffee to a softened temperature sufficient to permit portions of it to be pulled from the mass, pulling portions of it from the mass in the form of fine strands while circumferentially winding the strands about a core forming area and causing the spooling to occur along the length and about the periphery of the core forming area to form a continuous length of the core at a core forming area, contemporaneously axially moving the length of core along its axis off of an end of the core forming area, then transversely sawing an outer end of the axially moving length of core with consecutive cuts to form successive toffee pieces or toffee cores, immersing the toffee cores in a bath of milk chocolate, and cooling the chocolate-covered cores to place them in condition for packaging.

2. A method of manufacture of milk chocolate-coated toffee candy pieces comprising heating a mass of toffee to a softened temperature sufficient to permit portions of it to be pulled from the mass, pulling portions of it from the mass in the form of fine strands while a core forming area is rotated and the mass is oscillated along the length of the core forming area thereby causing criss-cross spooling to occur along the length and about the periphery of the core forming area to form a continuous length of the core, contemporaneously axially moving the length of core along its axis off of an end of the core forming area, then transversely severing an outer end of the axially moving length of core with consecutive cuts to form successive toffee pieces or toffee cores, immersing the toffee cores in a bath of milk chocolate, and cooling the chocolate-covered cores to place them in condition for packaging.

3. A method of manufacture of toffee candy pieces comprising heating a mass of toffee to a softened temperature sufficient to permit portions of it to be pulled from the mass, pulling portions of it from the mass in the form of fine strands while a core forming area is rotated and the mass is oscillated along the length of the core forming area thereby causing criss-cross spooling to occur along the length and about the periphery of the core forming area to form a continuous length of the core, contemporaneously internally pushing the length of the core along its axis off of an end of the core forming area, then transversely severing an outer end of the axially moving length of core with consecutive cuts to form successive toffee pieces or toffee cores.

4. A method of manufacture of milk chocolate-coated toffee candy pieces comprising heating a mass of toffee to a softened temperature sufficient to permit portions of it to be pulled from the mass, pulling portions of it from the mass in the form of fine strands, spooling and cross-crossing the strands to form a continuous length of core at a core forming area while contemporaneously moving the length of core along its axis away from said area, then severing an outer end of the length of core with consecutive cuts to form successive bit-sized pieces or toffee cores, passing the toffee cores in side-by-side relation through a series of vertical streams of milk chocolate positioned in side-by-side relation thereby allowing heated air to escape from the interior of the cores to minimize formation of bubbles in the coating then immersing the thus coated cores in a bath of milk chocolate, and cooling the chocolate-covered cores to place them in condition for packaging.

5. A method of manufacture of candy cores comprising heating a mass of toffee to a softened temperature sufficient to permit portions of it to be pulled from the mass, pulling portions of it from the mass in the form of fine strands, spooling the strands to form a continuous length of core while contemporaneously interiorly screwing an interior area of the length of core along its axis to axially move the core from the core forming area and then sawing an outer end of the length of core with consecutive cuts to form successive bit-sized pieces or candy cores.

6. The method of claim 1 further characterized by cooling the strands prior to sawing to provide strands each having a cooled thickness of about 0.010 inches to 0.012 inches.

7. The method of claim 1 further characterized by cooling the strands prior to sawing to ten degrees to twenty degrees above room temperature.

8. The method of claim 1 further characterized by the step of heating of the toffee mass to a temperature in the range of 172° to 180° F.

9. The method of claim 1 further characterized by blowing the coated toffee piece at an angle of about 117° relative to a plane through a bottom surface of the toffee piece to remove excess chocolate therefrom.

10. The method of claim 1 further characterized by air blowing the chocolate coated toffee piece before the chocolate solidifies to remove any excess chocolate therefrom.

11. The method of claim 1 further characterized by blowing heated air having a temperature of about 89° at each chocolate coated toffee piece to remove any excess chocolate therefrom.

12. A method of manufacture of candy pieces comprising heating a mass of candy to a softened temperature sufficient to permit portions of it to be pulled from the mass, pulling portions of it from the mass in the form of fine strands while a core forming area is rotated and the mass is oscillated along the length of the core forming area thereby causing criss-cross spooling to occur along the length and about the periphery of the core forming area to form a continuous length of the core, contemporaneously internally pushing the length of the core along its axis off of an end of the core forming area, then transversely severing an outer end of the axially moving length of core with consecutive cuts to form successive candy pieces or toffee cores.

13. A method of manufacture of milk chocolate-coated toffee candy pieces comprising heating a mass of toffee to a softened temperature sufficient to permit portions of it to be pulled from the mass, pulling portions of it from the mass forming fine strands while spooling the strands about a core forming area and causing the spooling to occur along the length and about the periphery of the core forming area to form a continuous length of the core at a core forming area, contemporaneously axially moving the length of core along its axis off of an end of the core forming area, then transversely sawing an outer end of the axially moving length of core with consecutive cuts to form successive toffee pieces or toffee cores, the sawed-off cores having strands having diameters of about 0.010"–0.012", immersing the toffee cores in a bath of milk chocolate, and cooling the chocolate-covered cores to place them in condition for packaging.

14. A method of manufacture of milk chocolate-coated toffee candy pieces comprising heating a mass of toffee to a softened temperature sufficient to permit portion of it to be pulled from the mass, pulling portions of it from the mass in the form of fine strands while a core forming area is rotated and the mass is oscillated along the length of the core forming area thereby causing criss-cross spooling to occur along the length and about the periphery of the core forming area to form a continuous length of the core, contemporaneously axially moving the length of core along its axis off of an end of the core forming area, then transversely severing an outer end of the axially moving length of core with consecutive cuts to form successive toffee pieces or toffee cores, the sawed-off cores having strands having diameters of about 0.010"–0.012", immersing the toffee cores in a bath of milk chocolate, and cooling the chocolate-covered cores to place them in condition for packaging.

15. A method of manufacture of toffee candy pieces comprising heating a mass of toffee to a softened temperature sufficient to permit portions of it to be pulled from the mass, pulling portions of it from the mass in the form of fine strands while a core forming area is rotated and the mass is oscillated along the length of the core forming area thereby causing criss-cross spooling to occur along the length and about the periphery of the core forming area to form a continuous length of the core, contemporaneously internally pushing the length of the core along its axis off of an end of the core forming area, then transversely severing an outer end of the axially moving length of core with consecutive cuts to form successive toffee pieces or toffee cores, the sawed-off cores having strands having diameters of about 0.010"–0.012".

16. A method of manufacture of milk chocolate-coated toffee candy pieces comprising heating a mass of toffee to a softened temperature sufficient to permit portions of it to be pulled from the mass, pulling portions of it from the mass in the form of fine strands, spooling and criss-crossing the strands to form a continuous length of core at a core forming area while contemporaneously moving the length of core along its axis away from said area, then severing an outer end of the length of core with consecutive cuts to form successive bite-sized pieces or toffee cores, the sawed-off cores having strands having diameters of about 0.010"–0.012", passing the toffee cores in side-by-side relation through a series of vertical streams of milk chocolate positioned in side-by-side relation thereby allowing heated air to escape from the interior of the cores to minimize formation of bubbles in the coating then immersing the thus coated cores in a bath of milk chocolate, and cooling the chocolate-covered cores to place them in condition for packaging.

17. A method of manufacture of candy cores comprising heating a mass of toffee to a softened temperature sufficient to permit portions of it to be pulled from the mass, pulling portions of it from the mass in the form of fine strands, winding the strands upon one another to form a continuous length of core while contemporaneously interiorly screwing an interior area of the length of core along its axis to axially move the core from the core forming area and then sawing an outer end of the length of core with consecutive cuts to form successive bite-sized pieces or candy cores, the sawed-off cores having strands having diameters of about 0.010"–0.012".

18. The method of claim 13 further characterized by cooling the strands prior to sawing to ten degrees to twenty degrees above room temperature.

19. The method of claim 13 further characterized by the steps of heating of the toffee mass to a temperature in the range of 172° to 180° F.

20. The method of claim 13 further characterized by blowing the coated toffee piece at an angle of about 117° relative to a plane through a bottom surface of the toffee piece to remove excess chocolate therefrom.

21. The method of claim 13 further characterized by air blowing the chocolate coated toffee piece before the chocolate solidifies to remove any excess chocolate therefrom.

22. The method of claim 13 further characterized by blowing heated air having a temperature of about 89° at each chocolate coated toffee piece to remove any excess chocolate therefrom.

23. A method of manufacture of candy pieces comprising heating a mass of candy to a softened temperature sufficient to permit portions of it to be pulled from the mass, pulling portions of it from the mass in the form of fine strands while a core forming area is rotated and the mass is oscillated along the length of the core forming area thereby causing criss-cross spooling to occur along the length and about the periphery of the core forming area to form a continuous length of the core, the fine strands having a thickness of about 0.010"–0.012", contemporaneously internally pushing the length of the core along its axis off of an end of the core forming area, then transversely severing an outer end of the axially moving length of core with consecutive cuts to form successive candy pieces or toffee cores.

24. A toffee coated candy comprised of a series of continuous threads of toffee wound annularly upon one another providing a crunchy non-solid core with at least two centrally located longitudinally extending interior openings therein which openings are linked together, and milk chocolate-coating an exterior of said core.

25. The candy of claim 24 further characterized by said openings each having internal screw threaded surface areas.

26. A toffee coated candy comprised of a series of continuous threads of toffee wound annularly upon one another providing a crunchy non-solid core with at least two centrally located longitudinally extending interior openings therein which openings are linked together, the threads of toffee each having a diameter of about 0.010"–0.012", and milk chocolate-coating an exterior of said core.

27. The candy of claim 26 further characterized by said openings each having internal screw threaded surface areas.

* * * * *